(12) United States Patent
Schollhammer et al.

(10) Patent No.: US 11,376,936 B2
(45) Date of Patent: Jul. 5, 2022

(54) SIDE RAIL

(71) Applicant: Oakmoore Pty Ltd, Salisbury (AU)

(72) Inventors: Wolfgang Schollhammer, Salisbury (AU); Zenon Theodoulou, Salisbury (AU)

(73) Assignee: Oakmoore Pty Ltd., Salisbury (AU)

(*) Notice: Subject to any disclaimer, the term of this patent is extended or adjusted under 35 U.S.C. 154(b) by 0 days.

(21) Appl. No.: 17/058,325

(22) PCT Filed: May 30, 2019

(86) PCT No.: PCT/AU2019/050542
§ 371 (c)(1),
(2) Date: Nov. 24, 2020

(87) PCT Pub. No.: WO2019/227159
PCT Pub. Date: Dec. 5, 2019

(65) Prior Publication Data
US 2021/0206250 A1    Jul. 8, 2021

(30) Foreign Application Priority Data

May 31, 2018   (AU) ............................... 2018901952

(51) Int. Cl.
*B60J 7/16* (2006.01)
*B60J 10/00* (2016.01)
(Continued)

(52) U.S. Cl.
CPC ............ *B60J 7/1607* (2013.01); *B60J 7/041* (2013.01); *B60J 7/068* (2013.01); *B60J 10/45* (2016.02)

(58) Field of Classification Search
CPC ..... B60J 7/04; B60J 7/041; B60J 7/141; B60J 7/1607; B60J 10/45; B60P 7/02
(Continued)

(56) References Cited

U.S. PATENT DOCUMENTS

| 5,040,843 A * | 8/1991 | Russell ..................... E06B 9/58 |
| | | 296/98 |
| 5,228,736 A | 7/1993 | Dutton |

(Continued)

FOREIGN PATENT DOCUMENTS

WO    1998/032943 A1    7/1998

OTHER PUBLICATIONS

International Search Report and Written Opinion for PCT/AU2019/050542 dated Aug. 15, 2019 (8 pages).
(Continued)

*Primary Examiner* — Jason S Daniels
(74) *Attorney, Agent, or Firm* — Oakmoore Pty Ltd.

(57) ABSTRACT

A side rail for a cargo bed of a vehicle comprising an elongate body that defines a longitudinal axis; an axially extending drive channel disposed at a medial side of the body and defining an opening therein for receiving a drive chain, the drive channel having a recessed inner portion and a stepped outer portion adjacent the opening; a first receiving channel disposed within an upper wall of the outer portion of the drive channel and extending axially thereal-ong; a first sealing member disposed within the first receiving channel; a second receiving channel disposed opposite the first receiving channel within a lower wall of the outer portion of the drive channel and extending axially thereal-ong; and a guide element disposed within the second receiving channel and projecting upwardly therefrom, the guide element having an upper contact surface for slidably con-tacting a surface of the drive chain.

13 Claims, 6 Drawing Sheets

(51) Int. Cl.
*B60J 7/06* (2006.01)
*B60J 7/04* (2006.01)

(58) Field of Classification Search
USPC ............... 296/98, 100.01, 100.03, 100.06
See application file for complete search history.

(56) References Cited

U.S. PATENT DOCUMENTS

| | | | |
|---|---|---|---|
| 5,330,246 | A | 7/1994 | Bernardo |
| 5,584,521 | A | 12/1996 | Hathaway et al. |
| 6,669,264 | B1 | 12/2003 | Tucker |
| 7,954,876 | B2 | 6/2011 | Kosinski |
| 9,381,794 | B2 * | 7/2016 | Gomes ................. B60P 7/06 |
| 10,328,778 | B2 * | 6/2019 | Aubrey ................ B60J 7/141 |
| 2016/0114666 | A1 | 4/2016 | Xu |
| 2017/0001499 | A1 | 1/2017 | Facchinello |
| 2018/0118002 | A1 * | 5/2018 | Koengeter ........... B60J 7/196 |

OTHER PUBLICATIONS

International Search Report and Written Opinion for PCT/AU2019/050543 dated Aug. 15, 2019 (9 pages).
Non-Final Office Action dated Jan. 13, 2022 for related U.S. Appl. No. 17/058,331 (21 pages).

\* cited by examiner

SIDE RAIL

CROSS-REFERENCE TO RELATED APPLICATIONS

This application is a national stage of, and claims priority to, Patent Cooperation Treaty Application No. PCT/AU2019/050542, filed on May 30, 2019, which application claims priority to Australian Patent Application No. AU2018901952, filed on May 31, 2018, which applications are hereby incorporated herein by reference in their entireties.

BACKGROUND

Numerous types of truck bed covers can be arranged over the utility or cargo bed portion of a ute or pickup truck to secure and protect the bed including cargo items disposed therein. In particular, roll top covers generally include a motorized or mechanical drive system for operably covering and uncovering the top of an open cargo bed, truck box or the like by way of an extendable and retractable slat assembly.

Prior art roll top covers can suffer from a number of drawbacks. By way of example, such roll top covers may not be fully weather resistant and/or impervious to moisture and dust. Additionally, the frictional forces that are produced between the drive chain and the associated drive chain track or rail during operation (i.e., opening and/or closing) of the roll top cover can be significant so as to make closing and/or opening difficult for a user. Further to this, movement or vibration of the slats of the roll top cover can result in the production of undesirable noise during operation of the associated vehicle.

Accordingly, an improved roll top cover that overcomes one or more of the above disadvantages is required.

BRIEF DESCRIPTION OF THE DRAWINGS

To assist in understanding the invention and to enable a person skilled in the art to put the invention into practical effect, examples will be described by way of example only with reference to the accompanying drawings, in which.

DETAILED DESCRIPTION OF THE INVENTION

The disclosure relates to a side rail for inclusion in a roll top cover that is operable between an extended or closed position and a retracted or open position when installed on a cargo bed of a vehicle, such as pickup trucks and utility vehicles. Elements of the invention are illustrated in concise outline form in the drawings, showing only those specific details that are necessary to understand the examples of the present invention, but so as not to provide excessive detail that will be obvious to those of ordinary skill in the art in light of the present description.

In this specification, adjectives such as first and second, top and bottom, upwards and downwards, and the like may be used solely to distinguish one element or action from another element or action without necessarily requiring or implying any actual such relationship or order. Words such as "comprises" or "includes" are intended to define a non-exclusive inclusion, such that a method or apparatus that comprises a list of elements does not include only those elements but may include other elements not expressly listed, including elements that are inherent to such a method or system.

According to a first aspect, although not necessarily the only aspect or the broadest aspect, the disclosure includes in a side rail for a cargo bed of a vehicle comprising:

an elongate body that defines a longitudinal axis;

an axially extending drive channel disposed at a medial side of the body and defining an opening therein for receiving a drive chain, the drive channel having a recessed inner portion and a stepped outer portion adjacent the opening;

a first receiving channel disposed within an upper wall of the outer portion of the drive channel and extending axially therealong;

a first sealing member disposed within the first receiving channel;

a second receiving channel disposed opposite the first receiving channel within a lower wall of the outer portion of the drive channel and extending axially therealong; and a guide element disposed within the second receiving channel and projecting upwardly therefrom, the guide element having an upper contact surface for slidably contacting a surface of the drive chain.

The side rail of the present aspect is for operation of a roll top cover and/or a tonneau cover.

In one example, the side rail further comprises:

a third receiving channel positioned between and adjacent the second receiving channel and the opening; and a second sealing member disposed within the third receiving channel.

In one example, the first sealing member comprises a base positioned within the first receiving channel and a pair of curved projections extending therefrom into the drive channel for contacting an upper surface of the drive chain and/or a slat of the roll top cover.

In particular examples, the second sealing member curves upwardly and medially into the drive channel.

In some examples, front and/or rear end portions of the body include a respective end cap engaged thereto.

The recessed inner portion may define a gutter.

In certain examples, the side rail of the present aspect further comprises an axially extending support channel recessed in an upper side of the body and opening upwardly therefrom. With respect to such examples, the support channel is suitably a U-shaped channel having opposed lip portions extending toward one another. Preferably, the side rail further comprises a cover element engaged within the support channel.

The support channel is configured for receiving at least partly therein one or more automotive accessories. Preferably, the one or more automotive accessories are selected from the group consisting of a railing system, a trim element, a sail plane element, a sports bar element, a canopy, a cabin guard, a storage rack and any combination thereof.

In one example, the side rail further comprises:
a fourth receiving channel recessed in a lower side of the body and extending axially therealong, the fourth receiving channel adjacent a lateral edge portion of the lower side; and
a third sealing member disposed within the fourth receiving channel and extending laterally therefrom so as to overlie the lateral edge portion.

In another aspect, the disclosure includes a roll top cover assembly for operably covering a cargo bed of a vehicle, comprising the side rail of the aforementioned aspect.

In a further aspect, the disclosure inlcudes a tonneau cover assembly for operably covering a cargo bed of a vehicle, comprising the side rail.

Particular advantages of the side rail include providing improved and smoother control and operation of an associated drive chain and slat assembly that significantly reduces any movement, in particular twisting and/or side to side movement, therebetween. A further advantage resides in the provision of a side rail that contributes to the drainage of any debris, fluids, dust and the like away from the roll top cover as well as prevents or minimises such debris, fluids, dust and the like from entering the cargo bed of the vehicle.

Figure 1:
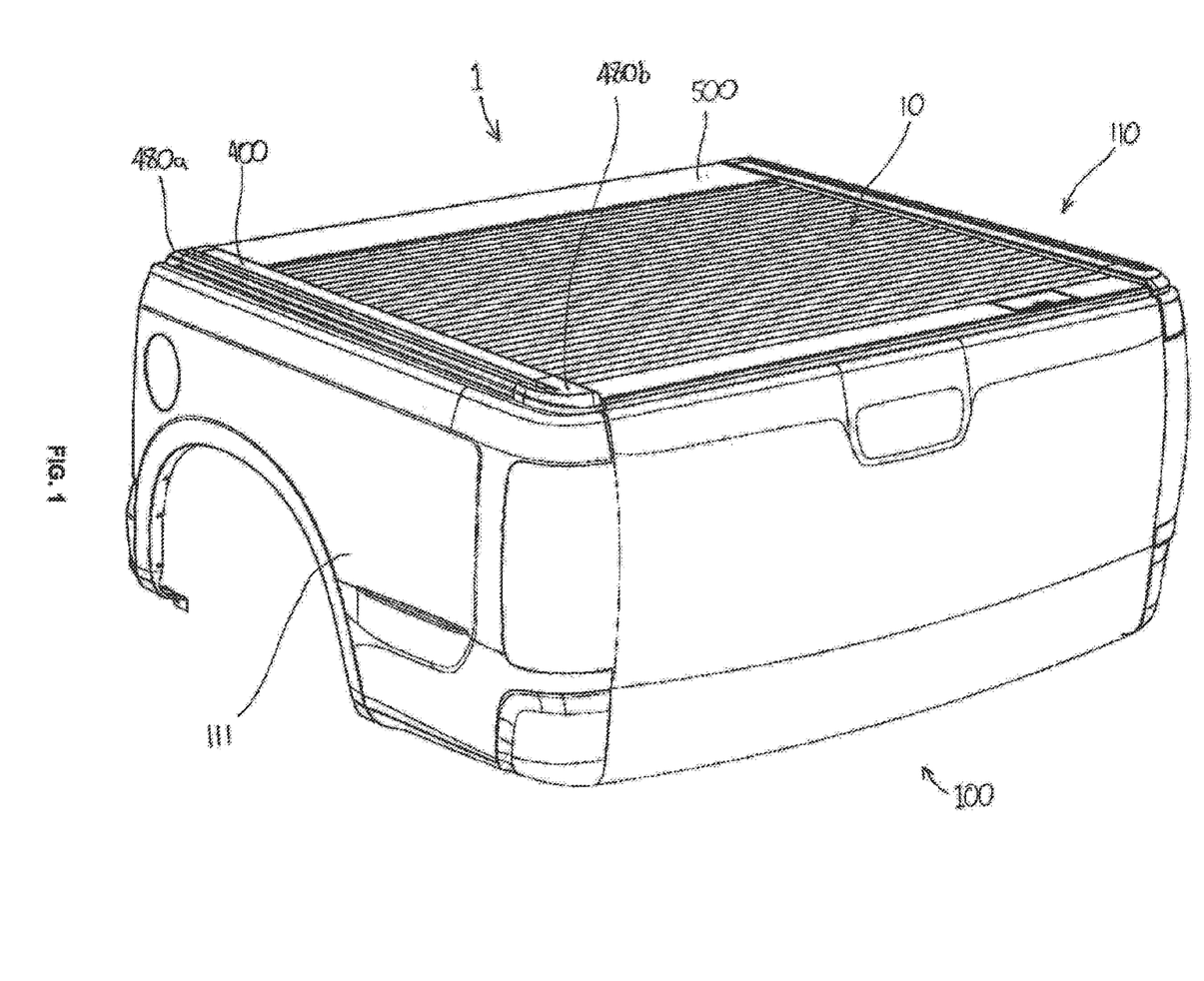
FIG. 1 is a top-down perspective view of a roll top cover suitably installed on a vehicle.

FIGS. 1 to 5 illustrate a side rail 400. As illustrated in FIG. 1, the side rail 400 is configured for being part of a roll top cover 1 for covering a cargo bed 110 of a vehicle 100. The side rail 400 is configured to be operably coupled to a drive chain 300 and an associated slat assembly 10 so as to allow for slidable movement of the roll top cover 1 between an open or retracted position and a closed or extended position, as illustrated by FIG. 1. The slat assembly 10 is constructed of a plurality of successive and pivotably interconnected slats 11. Similarly, the drive chain 300 comprises a plurality of successive and pivotably interconnected drive chain elements 301, with each drive chain element 301 engaged to opposed side portions or end walls of a single slat 11.

Figure 2:
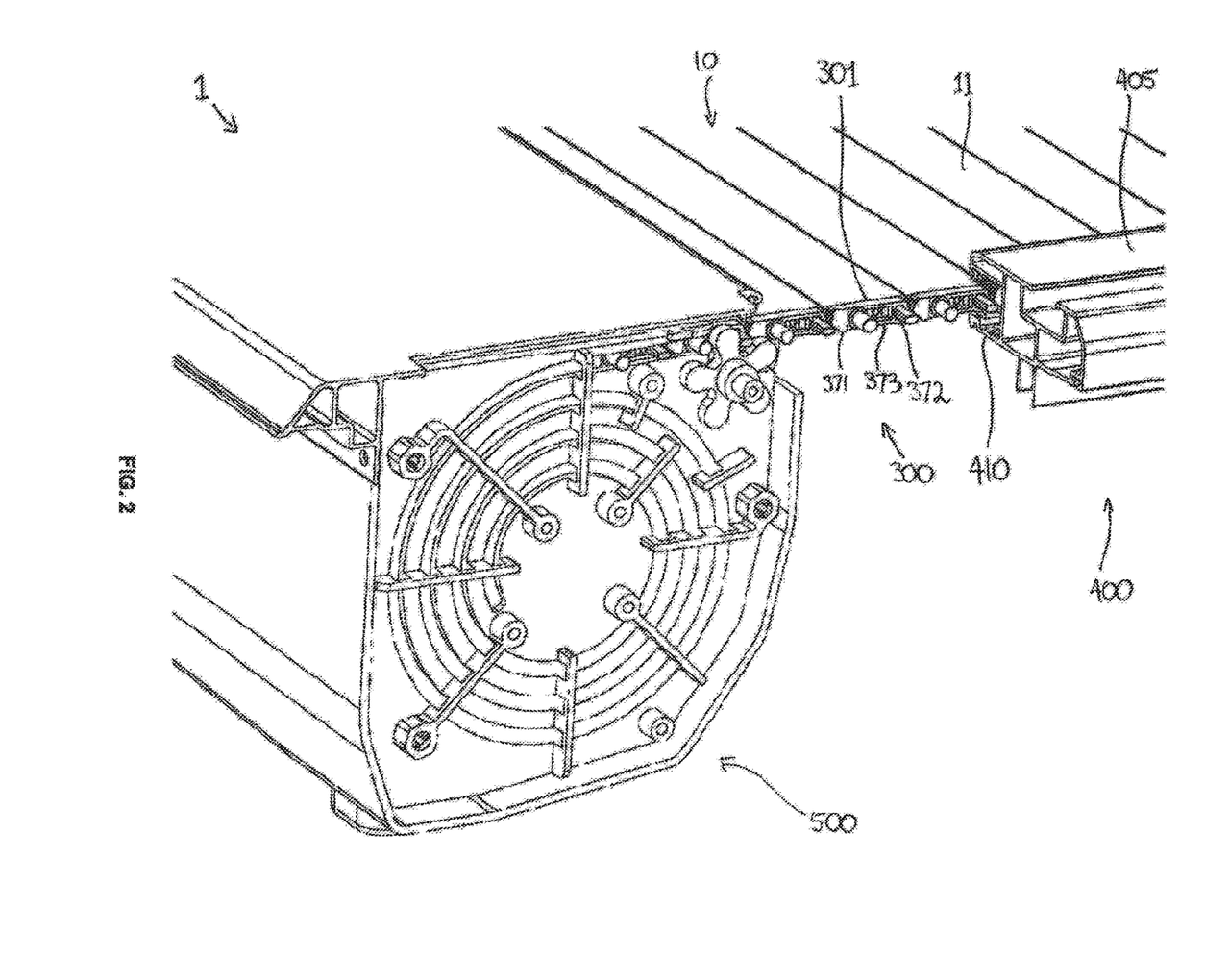
FIG. 2 illustrates a perspective view of a side rail for operation of the roll top cover of FIG. 1 prior to installation on a vehicle.
Figure 3:
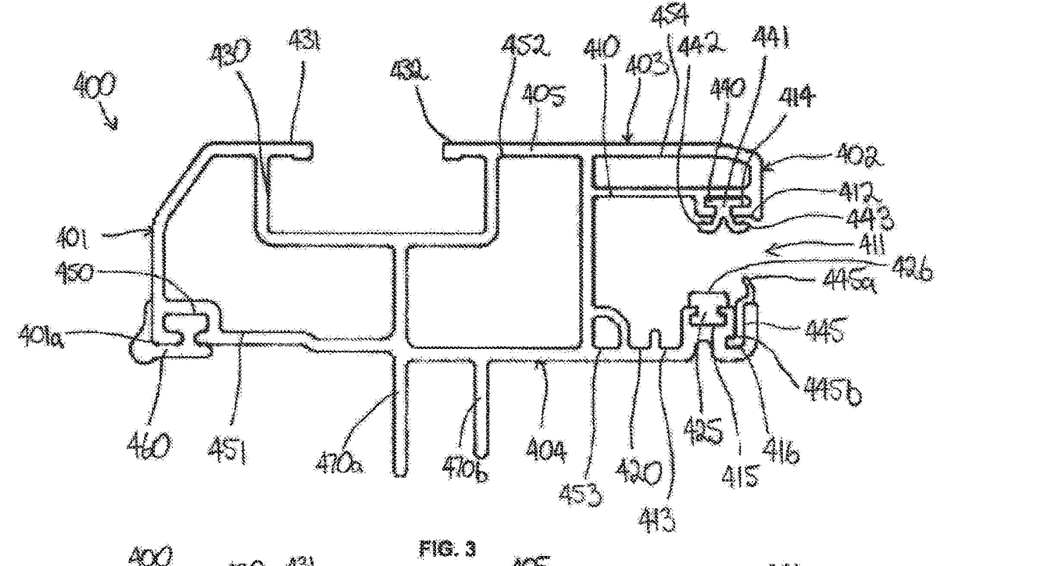
FIG. 3 is a cross-sectional view of the side rail of FIG. 2.
Figure 4:
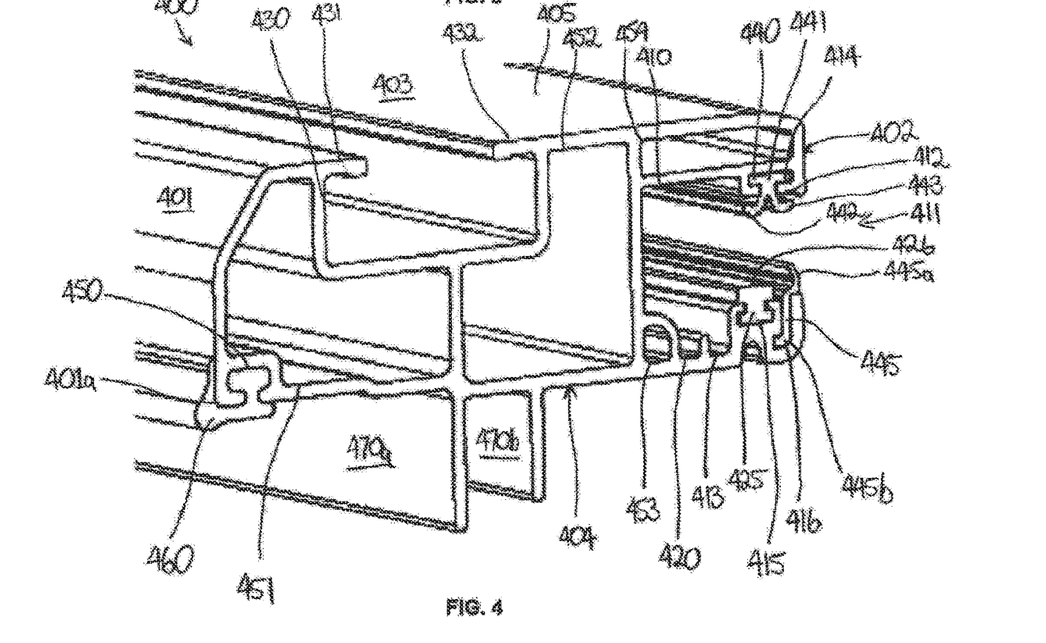
FIG. 4 illustrates an end-on perspective view of the side rail of FIG. 2.

As shown in FIGS. 2 to 4, each drive chain element 301 is configured for operably connecting its respective slat 11 to the side rail 400. From FIG. 2, it can be observed that the roll top cover 1 is operable by way of a drive system 500 to move between the extended position, in which the slats 11 of the slat assembly 10 are arranged and extend between opposed side rails 400 so as have the respective upper surfaces thereof substantially flush there together and thereby define a substantially flattened or planar arrangement of the slat assembly 10 (i.e., to restrict access to the underlying cargo bed 110, see FIG. 1), and the retracted position, in which the slat assembly 10 attains a substantially curved or spiral arrangement so as to enable a user access to the cargo bed 110 thereunder.

Figure 5:
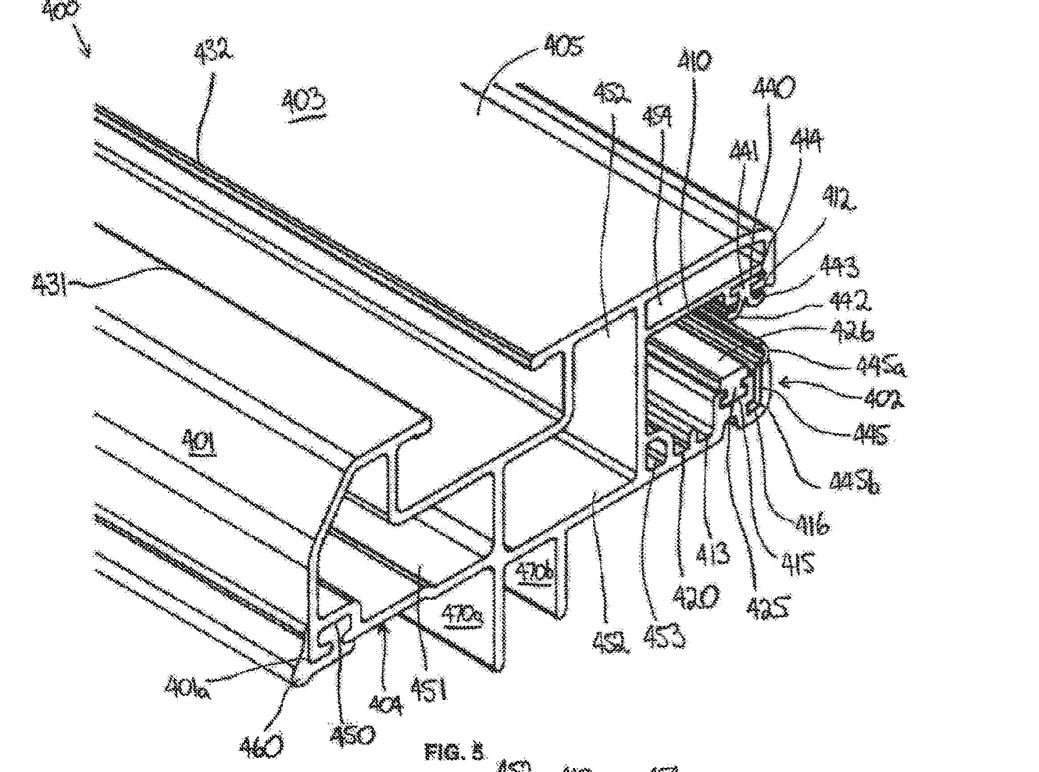
FIG. 5 illustrates a top down perspective view of the side rail of FIG. 2.

Referring to FIGS. 3 to 5, the side rail 400 includes an elongate body 405 having a length and first and second ends and further being defined by opposed lateral and medial sides 401,402 as well as opposed upper and lower sides 403,404. It will be appreciated that the sides 401-404 define a relatively low profile of the side 400 when in cross-section. Opening outwardly or laterally from the medial side 402 of the body 405 is a T-shaped drive channel 410. In this manner, the drive channel 410 defines an opening 411 that extends along the length of the body 405. As shown in FIG. 2, the opening 411 is configured to receive therein or therethrough a portion of the drive chain 300 and/or the associated slat assembly 10 so as to allow for slidable movement thereof within the drive channel 410 in first and second directions (i.e., forward and rearward directions relative to the cargo bed 110 of the vehicle 100).

The drive channel 410 includes a stepped or narrowed lateral or outer portion 412 that defines the opening 411 and a recessed medial or inner portion 413. A lower portion of the recessed inner portion 413 defines a gutter 420 for receiving and draining any debris, dust, fluids and the like that have migrated from the drive chain 300 and/or slat assembly 10 through the outer portion 412 of the drive channel 410.

Disposed in an upper wall or portion of the outer portion 412 and adjacent the opening 411 of the drive channel 410 and extending there along is a first receiving slot or channel 414. In this manner, the first receiving channel 414 defines a T-shaped space or slot that opens downwardly into the outer portion 412 of the drive channel 410. The outer portion 412 further includes second and third receiving channels 415,416 that are each disposed opposite the first receiving channel 414 in a lower portion of the outer portion 412 of the drive channel 410. Similar to the first receiving channel 414, the second receiving channel 415 defines a T-shaped space or slot that opens upwardly into the drive channel 410. The third receiving channel 416 is positioned adjacent and spaced laterally from the second receiving channel 415 and adjacent the opening 411 medially, which defines a J-shaped space or slot that opens upwardly into the drive channel 410.

As can be observed from FIGS. 3 to 5, a first sealing member 440 is disposed within the first receiving channel 414. The first sealing member 440 comprises a base 441 that is rectangular in cross-section and of suitable dimensions for being securely and frictionally received within the first receiving channel 414. Extending downwardly from the base 441 are first and second curved projections 442,443 that are angularly disposed with respect to each other, such that each curved projection 442,443 is configured to contact an upper surface of the drive chain 300 and/or the slat assembly 10. In this regard, the first curved projection 442 extends or is angled laterally or outwardly towards the opening 411 defined by the drive channel 410, whilst the second curved projection 443 extends or is angled medially or inwardly towards the recessed inner portion 413. As a result of this arrangement, the first sealing member 440 helps to not only prevent or minimise debris, dust, fluids and the like from entering the drive channel 410 and ultimately the gutter 420, but also acts to reduce the movement or splashing of such debris, dust, fluids and the like out of the gutter 420 once drained or collected therein. As such, this arrangement advantageously acts to keep the cargo bed 110 dry.

Further to the above and disposed within the third receiving channel 416 is an elongate second sealing member 445 that projects upwardly therefrom and extends longitudinally at least partly the length of the body 405. To this end, a first end 445a of the second sealing member 445 curves upwardly and inwardly into the drive channel 410 so as to be configured to slidingly abut or contact a lower or bottom surface of each of the overlying drive chain elements 301 and/or the slats 11 as they move thereover in the first or second direction within the drive channel 410. A second end 445b of the second sealing member 445 is of suitable dimensions for being securely received within the third receiving channel 416. The first end 445a of the second sealing member 445 is preferably made of a resiliently deformable material that allows for the first end 445a to elastically deform to accommodate a range of different profiles of the bottom surface of the drive chain elements 301 sliding thereover. As can be observed in FIG. 2, the bottom surface of the drive chain elements 301 includes spaced apart first and second arcuate projections 371,372 that are separated by a substantially flattened portion 373. As such, the second sealing member 445 acts to minimise the likelihood of debris, fluids, dust or the like that has collected in, for example, the gutter 420 migrating between the lower surface of the drive chain 300 and the drive channel 410 of the side rail 400 and into the cargo bed 110 of the vehicle 100.

It will be appreciated that the first and second sealing members 440,445 may comprise any suitable material known in the art, including rubber materials of a suitable grade and shore hardness. Preferably, the material to be used for the sealing members 440,445 demonstrates adequate levels of fluid and/or chemical resistance as well as frost and heat resistance. Additionally, the material to be used for the sealing members 440,445 suitably demonstrates a requisite level of flammability and UV resistance as typically required for automotive applications.

As shown in FIGS. 3 to 5, the side rail 400 further includes an I-shaped guide or contact element 425 disposed within the second receiving channel 415. The contact element 425 defines an upper contact surface 426 that is adapted to slidably receive, at least partly, thereon the bottom surface of the drive chain elements 301. Accordingly, the contact element 425 is preferably of a material that minimises the frictional forces between the drive chain element 301 and the underlying contact surface 426.

In cross-section, it can be observed that the body 405 of the side rail 400 includes first, second, third and fourth hollow portions 451-454. The hollow portions 451-454 are configured to reduce the effective weight of the side rail 400, whilst also maintaining a requisite strength for the structural integrity of the side rail 400. Additionally, first and second ends of the body 405 are both open ended to define a space therebetween.

The front and rear ends of the side rail 400, that is those ends adjacent the cab and tailgate of the vehicle 100 respectively, terminate in a respective end piece or cap 480a,b, shown in FIG. 1. The caps 480a,b are configured to matingly and frictionally snap or slide in place around the cross-sectional shape or configuration of the side rail 400. In addition to this, the caps 480a,b can be secured to their respective ends of the side rail 400 by means of one or more fasteners, as are known in the art. Alternatively, the caps 480a,b can be configured so as to have engagement portions (not shown) that are matingly and securely received within one or more of the hollow portions 451-454 of the body 405.

The above described relationship between the side rail 400, the drive chain 300 and the first and second sealing members 440,445 promotes any water which may enter the drive channel 410 moving into the gutter 420 and subsequently draining into a housing 510 of the drive system 500. A draining outlet (not shown) may then be made from a bottom portion of the housing 510 through the cargo bed 110 of the vehicle 100 to permit the release of debris, liquid, and the like therefrom and thereby maintaining the cargo bed 110 itself dry.

Figure 6:
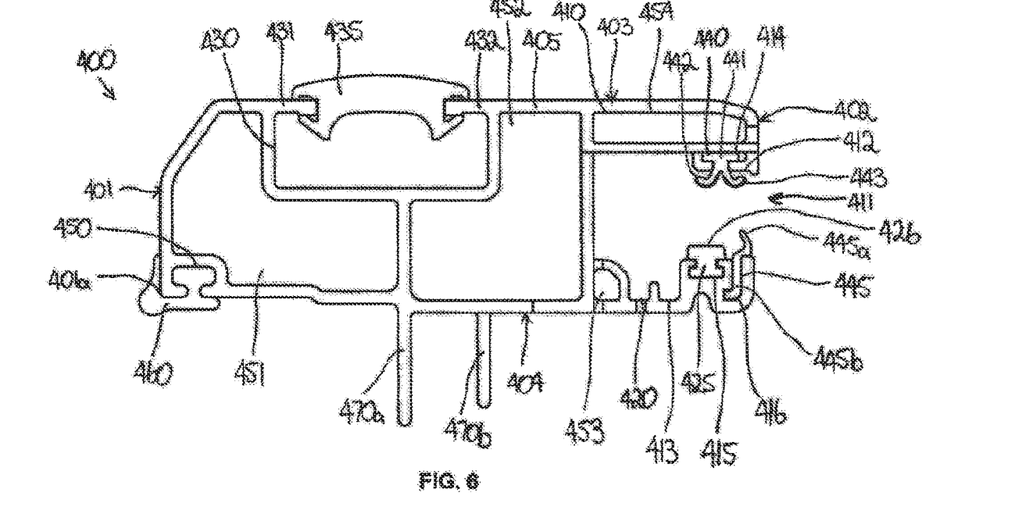
FIG. 6 is a cross-sectional view of the side rail of FIG. 2 having a removable cover strip attached thereto.

Recessed in the upper side 403 and opening upwardly therefrom is a U-shaped support track or channel 430. As can be observed from FIGS. 3 to 5, the support channel 430 has a pair of opposed lip portions 431,432 that are parallel or flush with the upper side 403. The support channel 430, and in particular the opposed lip portions 431,432 are designed to receive and secure a range of automotive accessories to the side rail 400. By way of example, and as shown in FIG. 6, the opposed lip portions 431,432 have matingly received a removeable cover strip 435 thereover. In this manner, the cover strip 435 may be used to cover the support channel 430 when not in use by another automotive accessory. Additional automotive accessories that may be received and engaged by the support channel 430 include, but are not limited to, a railing system, a trim element, a sail plane element, a sports bar element, a canopy, a cabin guard and a storage rack.

The lower side 404 of the body 405 further comprises an outwardly or downwardly opening fourth receiving channel 450 recessed therein and disposed adjacent a lateral edge portion 401a with the lateral side 401. Disposed within the fourth receiving channel 450 is a third sealing member 460 that extends outwardly therefrom and in a right-angled fashion over the lateral edge portion 401a to overlie a lower portion of the lateral wall 401. In this way, the third sealing member 460 is configured for abutting and sealingly contacting an upper surface of a side wall 111 of the cargo bed 110 when appropriately installed on the vehicle 100.

As can be observed in FIGS. 3 to 5, the lower side 404 of the body 405 also includes a pair of spaced apart and downward or outward extending perpendicular projections 470a,b. The first projection 470a has two functions, firstly to act as an end stop for one or more clamping members (not shown) which clamp the side rail 400 to the cargo bed 100. Secondly, the first projection 470a also has a paired of threaded apertures (not shown) positioned at opposing ends that function to hold a grub screw or the like therein. These grub screws (not shown) can be used to adjust the roll top cover 1 as a whole in such way that it will preferably be appropriately mounted concentric to the cargo bed 110.

Conversely, the second projection 470b can facilitate the mounting of one or more accessory rails or supports (not shown) if required. These accessory rails (not shown) can then be used to mount or engage other accessories, such as LED lights and a cargo manager (also called inner tub cargo divider).

Figure 7:
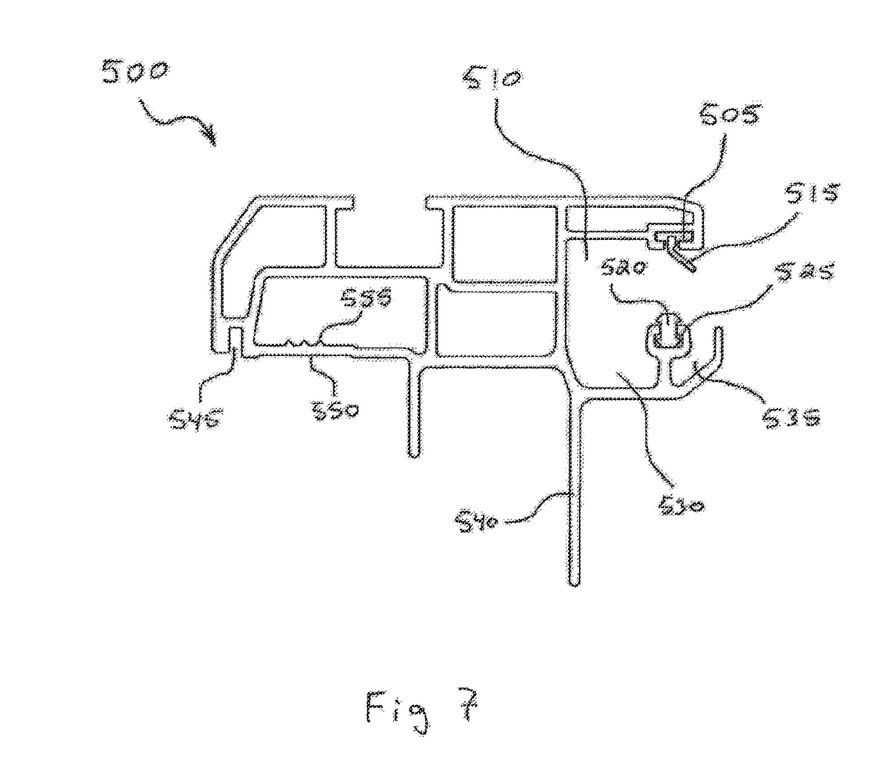
FIG. 7 is a cross-sectional view of another side rail.

FIG. 7 is a cross-sectional view of a side rail 500 according to an alternative example. The side rail 500 includes a first channel 505 disposed above a main drive channel 510. A first sealing member 515 is positioned in the first channel 505. A guide member 520 is positioned in a second channel 525. A water gutter 530 and a water overflow channel 535 are positioned on either side of the second channel 525.

A mounting rib 540 provides a location for rigid attachment of accessories such as an LED light. Also, a loom/harness channel 542 enables effective concealment of electrical wiring and cables.

An outboard side of the side rail 500 includes a side rail tab seal channel 545. Also, a recess 550 provides a location for a foam seal. Further, ribs 555 assist in the effective clamping of the side rail 500 to a vehicle.

Figure 8:
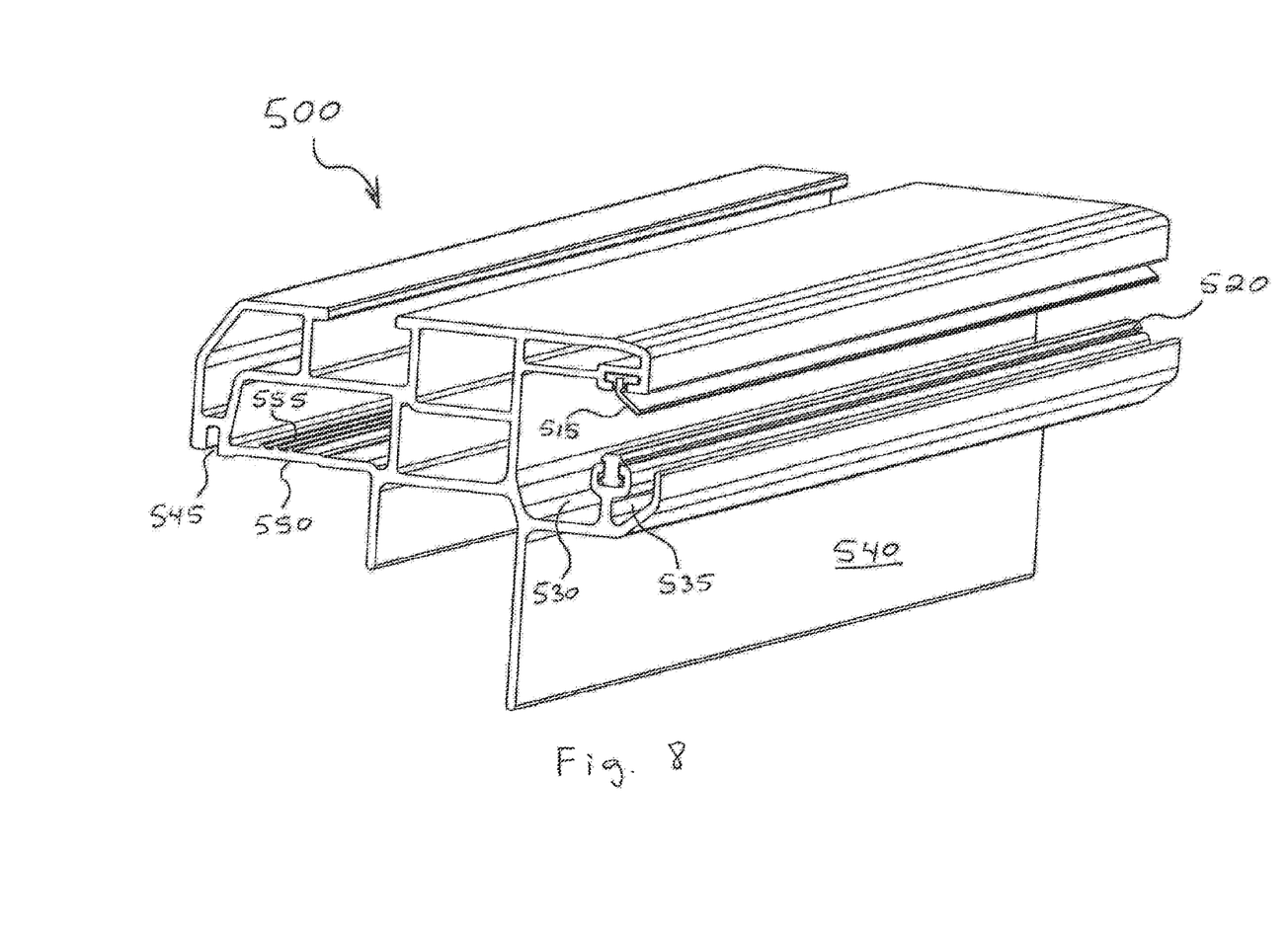
FIG. 8 is a perspective view of the side rail of FIG. 7.

FIG. 8 is a perspective view of the side rail 500, which illustrates in particular the angled profile of the first sealing member 515.

The side rails 400, 500 may be made or constructed from any suitable material known in the art, including, but not limited to, metals such as aluminium (e.g., marine grade aluminium) and steel, and polymeric materials, such as plastics (e.g., reinforced plastics). In one preferred embodiment, the side rail 400, 500 is made or constructed of material/s other than aluminium so as to reduce friction between it and the drive chain 300.

The above description of various embodiments of the present disclosure is provided for purposes of description to one of ordinary skill in the related art. It is not intended to be exhaustive or to limit the invention to a single disclosed example. As mentioned above, numerous alternatives and variations to the disclosure will be apparent to those skilled in the art of the above teaching. Accordingly, while some alternative embodiments have been discussed specifically, other embodiments will be apparent or relatively easily developed by those of ordinary skill in the art. The disclosure is intended to embrace all alternatives, modifications, and variations of the disclosure that have been discussed herein, and other examples that fall within the spirit and scope of the above described disclosure.

The invention claimed is:

1. A side rail for a cargo bed of a vehicle comprising:
an elongate body that defines a longitudinal axis;
an axially extending drive channel disposed at a medial side of the body and defining an opening therein for receiving a drive chain, the drive channel having a recessed inner portion and a stepped outer portion adjacent the opening;
a first receiving channel disposed within an upper wall of the outer portion of the drive channel and extending axially therealong;
a first sealing member disposed within the first receiving channel;
a second receiving channel disposed opposite the first receiving channel within a lower wall of the outer portion of the drive channel and extending axially therealong;
a guide element disposed within the second receiving channel and projecting upwardly therefrom, the guide element having an upper contact surface for slidably contacting a surface of the drive chain;
a third receiving channel;
a second sealing member disposed within the third receiving channel; wherein the third receiving channel is positioned between and adjacent the second receiving channel and the opening.

2. The side rail of claim 1, wherein the side rail is for operation of a roll top cover and/or a tonneau cover.

3. The side rail of claim 1, wherein the second sealing member curves upwardly and medially into the drive channel.

4. The side rail of claim 1, wherein the first sealing member comprises a base positioned within the first receiving channel and a pair of curved projections extending therefrom into the drive channel for contacting an upper surface of the drive chain and/or a slat of the roll top cover.

5. The side rail of claim 1, wherein front and/or rear end portions of the body include a respective end cap engaged thereto.

6. The side rail of claim 1, wherein the recessed inner portion defines a gutter.

7. The side rail of claim 1, further comprising an axially extending support channel recessed in an upper side of the body and opening upwardly therefrom.

8. The side rail of claim 1, wherein the support channel is a U-shaped channel having opposed lip portions extending toward one another.

9. The side rail of claim 8, further comprising a cover element engaged within the support channel.

10. The side rail of claim 8, wherein the support channel is configured for receiving at least partly therein one or more automotive accessories.

11. The side rail of claim 10, wherein the one or more automotive accessories are selected from the group consisting of a railing system, a trim element, a sail plane element, a sports bar element, a canopy, a cabin guard, a storage rack and any combination thereof.

12. The side rail of claim 1, further comprising:
a fourth receiving channel recessed in a lower side of the body and extending axially therealong, the fourth receiving channel adjacent a lateral edge portion of the lower side; and
a third sealing member disposed within the fourth receiving channel and extending laterally therefrom so as to overlie the lateral edge portion.

13. The side rail of claim 1, wherein the second sealing member extends upward toward the first sealing member and beyond the contact surface of the guide element.

* * * * *

UNITED STATES PATENT AND TRADEMARK OFFICE
CERTIFICATE OF CORRECTION

PATENT NO. : 11,376,936 B2
APPLICATION NO. : 17/058325
DATED : July 5, 2022
INVENTOR(S) : Wolfgang Schollhammer et al.

It is certified that error appears in the above-identified patent and that said Letters Patent is hereby corrected as shown below:

In the Claims

Column 8, Line 14, Claim 8, replace "The side rail of claim 1" with --The side rail of claim 7--;

Column 8, Line 17, Claim 9, replace "The side rail of claim 8" with --The side rail of claim 7--; and Column 8, Line 19, Claim 10, replace "The side rail of claim 8" with --The side rail of claim 7--.

Signed and Sealed this
Twenty-eighth Day of November, 2023

*Katherine Kelly Vidal*

Katherine Kelly Vidal
*Director of the United States Patent and Trademark Office*